United States Patent

Sudo et al.

Patent Number: 5,957,987
Date of Patent: Sep. 28, 1999

[54] VEHICLE MOTION CONTROL APPARATUS

[75] Inventors: Hideki Sudo, Tokyo; Kazutaka Adachi, Yokohama; Ken Ito, Tokyo, all of Japan

[73] Assignee: Nissan Motor Co., Ltd., Yokohama, Japan

[21] Appl. No.: 08/879,219

[22] Filed: Jun. 19, 1997

[30] Foreign Application Priority Data

Jun. 19, 1996 [JP] Japan .................................. 8-158221

[51] Int. Cl.⁶ ....................................................... B60T 8/32
[52] U.S. Cl. .............................. 701/41; 701/36; 701/42; 180/422; 180/412; 303/146; 303/140
[58] Field of Search ................................ 701/36, 37, 41, 701/42, 43, 48, 38; 180/197, 415, 421, 446, 404, 410, 412, 422; 303/122, 140, 146, 147, 113.5; 280/142, 5.507, 5.51, 5.515, 5.514

[56] References Cited

U.S. PATENT DOCUMENTS

| | | | |
|---|---|---|---|
| 4,706,979 | 11/1987 | Kawabe et al. | 701/42 |
| 4,834,204 | 5/1989 | Ito et al. | 701/42 |
| 4,840,389 | 6/1989 | Kawabe et al. | 701/41 |
| 4,844,506 | 7/1989 | Moriguchi et al. | 701/38 |
| 4,953,650 | 9/1990 | Ohmura | 701/42 |
| 5,097,917 | 3/1992 | Serizawa et al. | 180/413 |
| 5,103,925 | 4/1992 | Imaseki et al. | 701/41 |
| 5,136,507 | 8/1992 | Shiraihi et al. | 701/41 |
| 5,182,711 | 1/1993 | Takahashi et al. | 701/41 |
| 5,228,757 | 7/1993 | Ito et al. | 701/70 |
| 5,257,828 | 11/1993 | Miller et al. | 701/41 |
| 5,303,989 | 4/1994 | Yasuno et al. | 303/147 |
| 5,341,296 | 8/1994 | Yasuno et al. | 701/41 |
| 5,428,532 | 6/1995 | Yasuno | 701/70 |
| 5,473,539 | 12/1995 | Shimizu et al. | 701/41 |
| 5,642,281 | 6/1997 | Ishida et al. | 701/41 |
| 5,816,669 | 10/1998 | Hiwatashi et al. | 303/148 |

*Primary Examiner*—Jacques H. Louis-Jacques
*Attorney, Agent, or Firm*—Foley & Lardner

[57] ABSTRACT

An apparatus for controlling a motion of a vehicle supported on steered and non-steered road wheels. A target vehicle motion value is calculated based on the steering angle and vehicle speed to provide a predetermined response characteristic related to a vehicle plane behavior. A target steering angle value for the non-steered road wheel to realize the vehicle plane behavior is calculated according to the target vehicle motion value. The non-steered road wheels are steered according to the calculated target steering angle value. The damping characteristic of the response characteristic is decreased as the vehicle speed increases.

8 Claims, 8 Drawing Sheets

VEHICLE MOTION CONTROL APPARATUS

BACKGROUND OF THE INVENTION

This invention relates to a vehicle motion control apparatus for controlling a plane vehicle behavior, such as vehicle yaw rate, during vehicle steering operation.

Figure 9A:
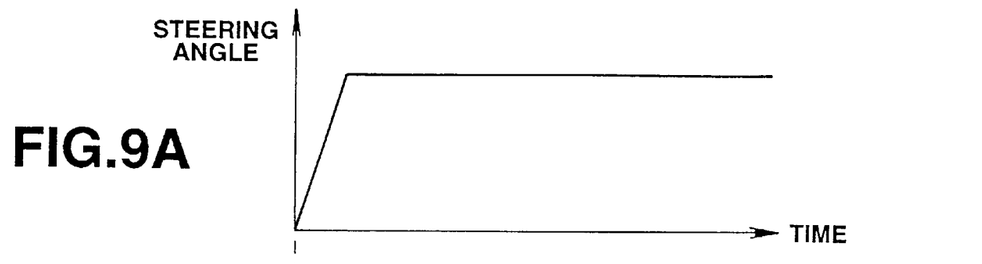
FIGS. 9A and 9B are graphs used in explaining the response characteristic obtained by the conventional vehicle motion control apparatus.
Figure 9B:
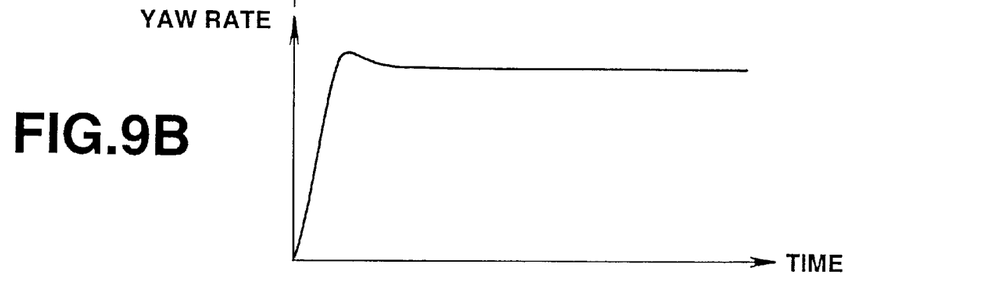

It is the current practice to control the vehicle yaw rate so as to ensure good vehicle stability during vehicle steering operation. For example, Japanese Patent Kokai No. 5-170116 discloses a vehicle motion control apparatus arranged to calculate a target yaw rate value (target vehicle motion value) by providing a time lag of first order and phase advance compensation with respect to the steering wheel steering angle. A target rear road wheel steering angle value required to bring the vehicle yaw rate into coincidence with the target yaw rate value is calculated from equations of motions based on various vehicle parameters. Such vehicle motion control is advantageous in that the vehicle yaw rate occurs with no phase delay with respect to steering angle changes (FIG. 9A). Furthermore, it is possible to minimize yaw rate oscillations so as to provide good steering response and stability (FIG. 9B). Since the yaw rate converges at a fast rate in response to steering angle changes, however, the driver would feel a sense of incompatibility resulting from the accelerated rate of convergence of vehicle oscillations.

SUMMARY OF THE INVENTION

A main object of the invention is to provide an improved vehicle motion control apparatus which can converge vehicle oscillations without providing any sense of incompatibility to the driver during vehicle steering operation at high vehicle speeds.

There is provided, in accordance with the invention, an apparatus for controlling a motion of a vehicle supported on steered and non-steered road wheels. The vehicle motion control apparatus comprises means for sensing vehicle operating conditions including steering angle and vehicle speed, and means for calculating a target vehicle motion value based on the sensed steering angle and vehicle speed to provide a predetermined response characteristic related to a vehicle plane behavior. The response characteristic has a damping characteristic. The vehicle motion control apparatus also comprises means for calculating a target steering angle value for the non-steered road wheel to realize the vehicle plane behavior according to the target vehicle motion value, means for steering the non-steered road wheels according to the calculated target steering angle value, and means for decreasing the damping characteristic as the sensed vehicle speed increases.

In another aspect of the invention, the vehicle motion control apparatus comprises means for sensing steering angle, means for sensing vehicle speed, and means for calculating a target vehicle motion value based on the sensed steering angle and vehicle speed to provide a predetermined vehicle plane behavior related response characteristic realized by a transfer function between the sensed steering angle and the target vehicle motion value. The transfer function has a damping coefficient. The vehicle motion control apparatus also comprises means for calculating a target steering angle value for the non-steered road wheel to realize the vehicle plane behavior according to the target vehicle motion value, means for steering the non-steered road wheels according to the calculated target steering angle value, and means for decreasing the damping coefficient as the sensed vehicle speed increases.

In another aspect of the invention, the vehicle motion control apparatus comprises detectors for sensing vehicle operating conditions including steering angle and vehicle speed, means for calculating a target vehicle motion value based on the sensed steering angle and vehicle speed to provide a predetermined response characteristic related to a vehicle plane behavior, the response characteristic having a damping characteristic, means for calculating a target steering angle value for the non-steered road wheel to realize the vehicle plane behavior according to the target vehicle motion value, means for steering the non-steered road wheels according to the calculated target steering angle value, and means for decreasing the damping characteristic as the sensed vehicle speed increases.

In still another aspect of the invention, the vehicle motion control apparatus comprises a first detector for sensing steering angle, a second detector for sensing vehicle speed, means for calculating a target vehicle motion value based on the sensed steering angle and vehicle speed to provide a predetermined vehicle plane behavior related response characteristic realized by a transfer function between the sensed steering angle and the target vehicle motion value, the transfer function having a damping coefficient, means for calculating a target steering angle value for the non-steered road wheel to realize the vehicle plane behavior according to the target vehicle motion value, means for steering the non-steered road wheels according to the calculated target steering angle value, and means for decreasing the damping coefficient as the sensed vehicle speed increases.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
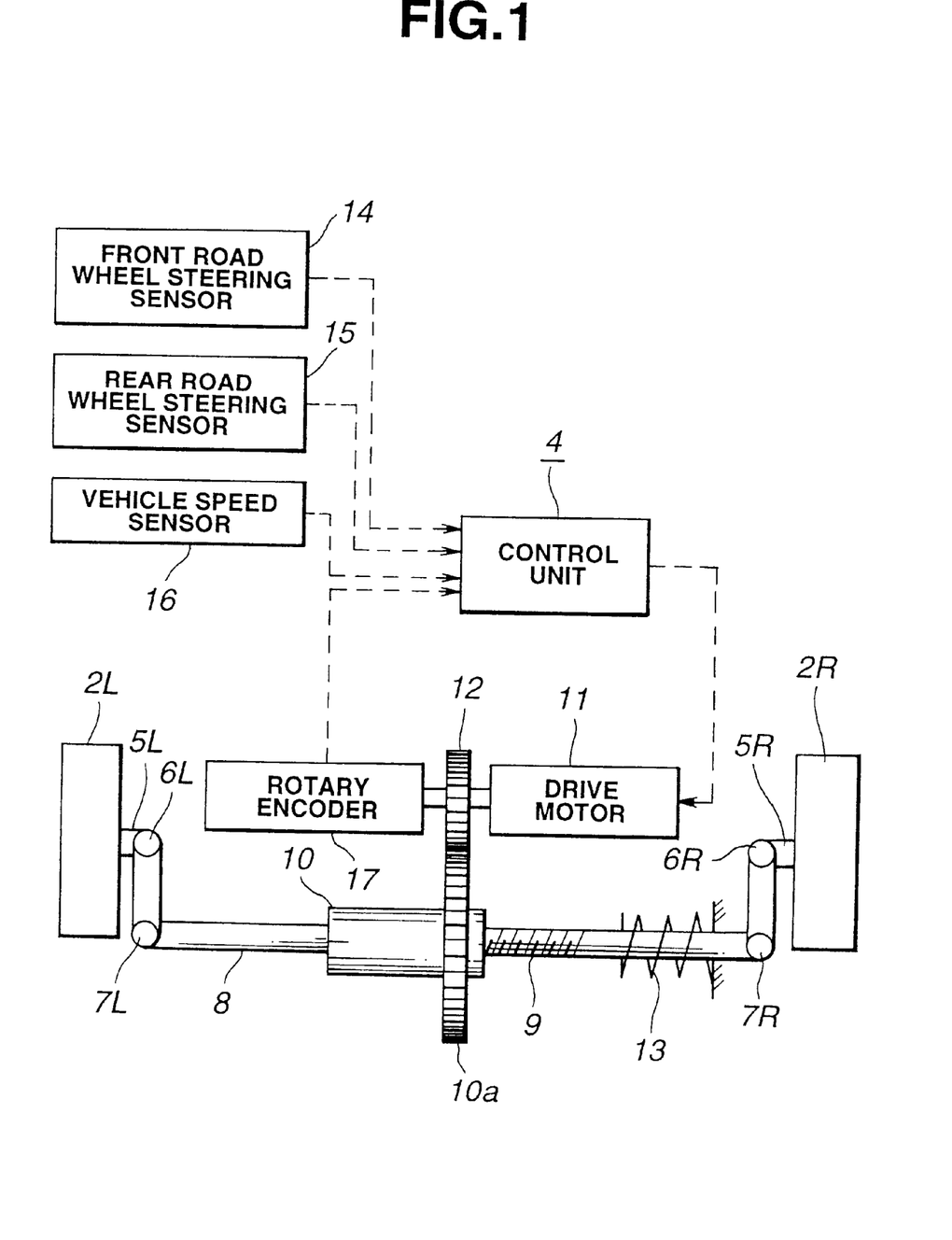
FIG. 1 is a schematic diagram showing one embodiment of a vehicle motion control apparatus made in accordance with the invention.

With reference to the drawings, and in particular to FIG. 1, there is shown a schematic diagram of a vehicle motion control apparatus embodying the invention. The invention will be described in connection with an automotive vehicle supported on a pair of steered front road wheels and a pair of non-steered rear road wheels. In this embodiment, the vehicle motion control apparatus is taken in the form of a control apparatus for controlling the steering angle of the rear-left and rear-right road wheels 2L and 2R. The rear-left road wheel 2L has a knuckle arm 5L coupled to a tie rod 8 through a kingpin 6L and a ball joint 7L. Similarly, the rear-right road wheel 2R has a knuckle arm 5R coupled to the tie rod 8 through a kingpin 6R and a ball joint 7R. The tie rod 8 is formed in its outer peripheral surface with a slide screw thread 9 held in threadable engagement with the internally threaded portion of a nut 10. The nut 10 has an external gear 10a secured on its outer peripheral surface. The external gear 10a is held in mesh engagement with a gear secured for rotation in unison with rotation of the output shaft of a drive motor 11. The drive motor 11, which may be in the form of a stepper motor, is electrically controlled and it determines the position of the tie rod 8 which, in turn, determines the steering angle of the rear road wheels 2L and 2R. The numeral 13 designates a return spring positioned to return the tie rod 8 to its neutral position.

Figure 2:
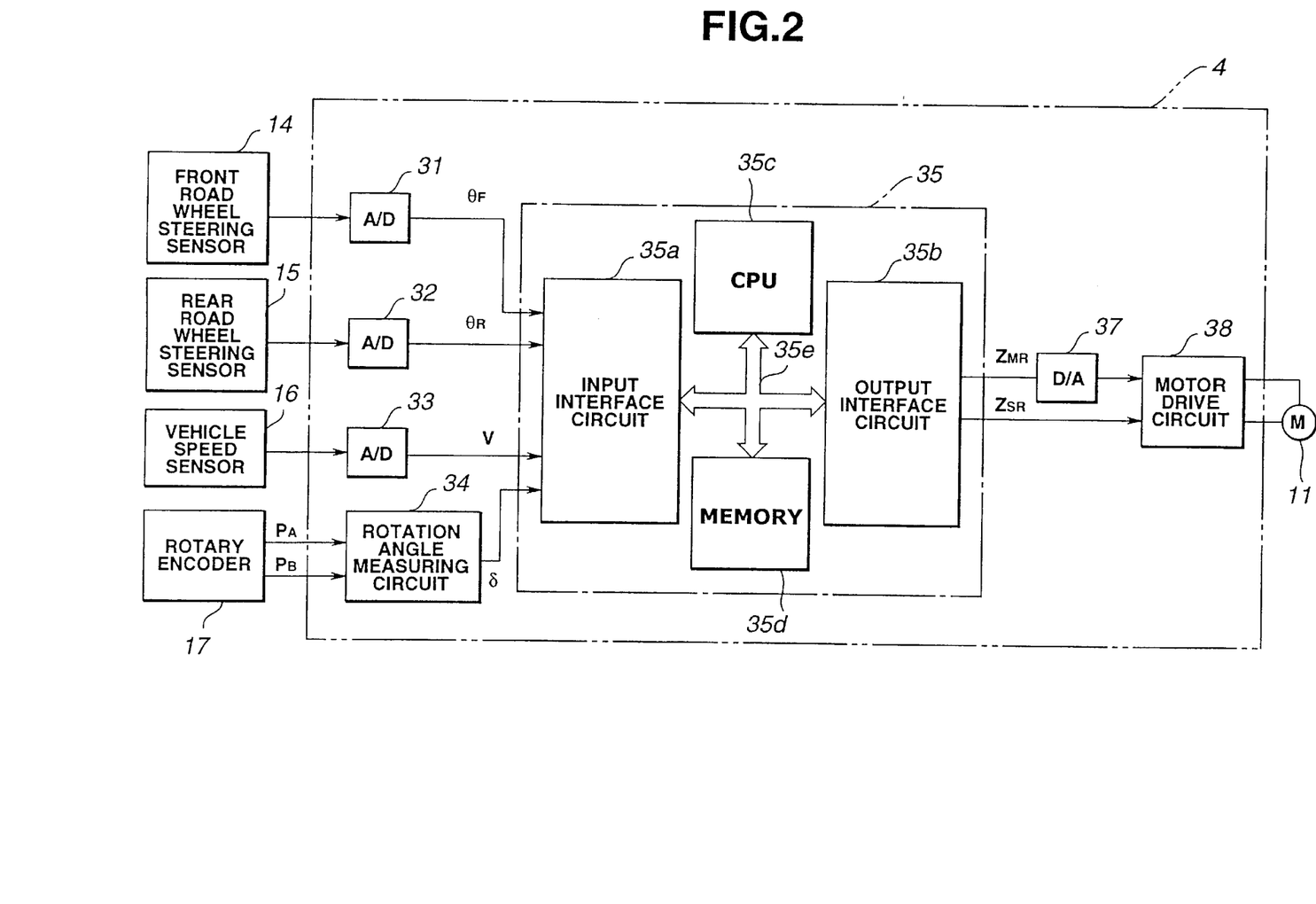
FIG. 2 is a block diagram showing the detailed arrangement of the control unit used in the vehicle motion control apparatus of FIG. 1.

Referring to FIG. 2, the drive motor 11 operates on a drive signal fed thereto from a motor drive circuit 38 to rotate the nut 10 at a desired angle. As a result, the tie rod 8 moves to the left or right to provide a desired rear-wheel steering angle. The rear road wheel steering angle is repetitively determined from calculations performed by a digital computer 35, these calculations being based upon various conditions of the automotive vehicle that are sensed during its operation. These sensed conditions include front road wheel steering angle, rear road wheel steering angle, vehicle speed and drive motor position. Thus, a front road wheel steering angle sensor 14, a rear road wheel steering angle sensor 15, a vehicle speed sensor 16 and a drive motor position sensor 17 are connected to the control unit 4. The front road wheel steering angle sensor 14 is provided to sense the steering angle $\theta_F$ of the front road wheels and it produces a signal indicative of the sensed front road wheel steering angle $\theta_F$ to an analog-to-digital converter 31 which converts this signal into digital form for application to the digital computer 35. The rear road wheel steering angle sensor 15 is provided to sense the steering angle $\theta_R$ of the rear road wheels and it provides a feedback signal to the digital computer 35 to ensure that the rear road wheel steering angle is correct to maintain a target value calculated by the digital computer 35 and it produces a signal indicative of the sensed rear road wheel steering angle $\theta_R$ to an analog-to-digital converter 32 which converts this signal into digital form for application to the digital computer 35. The vehicle speed sensor 16 is provided to sense the vehicle longitudinal speed V and it produces an electric signal indicative of the sensed vehicle speed V to an analog-to-digital converter 33 which converts this signal into digital form for application to the digital computer 35. The drive motor position sensor 17 is provided to sense the degree of rotation of the drive motor 11. The drive motor position sensor 17 may be taken in the form of a rotary encoder provided to produce two pulse signals $P_A$ and $P_B$ having 90° phase difference. The pulse signals $P_A$ and $P_B$ are fed to a drive motor position measuring circuit 34 which detects the direction of rotation of the drive motor 11. The drive motor position measuring circuit 34 produces a signal indicative of the present drive motor position $\delta$ with the use of an up/down counter which counts the inputted pulses downward or upward according to the detected direction of rotation of the drive motor 11. The count accumulated on the up/down counter corresponds to the present position $\delta$ of the drive motor 11.

The digital computer 35 includes an input interface circuit 35a, an output interface circuit 35b, a central processing unit 35c and a memory 35d. The central processing unit 35c communicates with the rest of the computer via data bus 35e. The memory contains programs for operating the central processing unit 35c and further contains appropriate data used in calculating appropriate values for the angle at which the drive motor 11 is to rotate and the direction in which the drive motor 11 is to rotate. The central processing unit 35c calculates a response characteristic of the yaw rate with respect to a change in vehicle speed V. This calculation is made with the use of look-up tables which define parameters as a function of vehicle speed. The calculated parameters are used to calculate the yaw rate response characteristic. A target yaw rate value $\Psi_M{}'$, which is the target non-steered road wheel steering angle value having this response characteristic is calculated based on the sensed front road wheel steering angle $\theta_F$. A target rear road wheel steering angle value $\Theta_R$, which can realize the target yaw rate $\Psi_M{}'$, is calculated. Finally, the angle at which the drive motor 11 is to rotate and the direction in which the drive motor 11 is to rotate are calculated based on the target rear road wheel steering angle value $\Theta_R$. The calculated angle and direction are transferred by the central processing unit 35c to the output interface circuit 35b which converts them into corresponding control signals $Z_{MR}$ and $Z_{SR}$. The control signal $Z_{MR}$ is fed to a digital-to-analog converter 37 which converts it into analog form for application to the motor drive circuit 38 which thereby rotates the drive motor 11 at an angle specified by the control signal $Z_{MR}$. The control signal $Z_{SR}$ is applied directly to the motor drive circuit 38 which thereby rotates the drive motor 11 in the direction specified by the control signal $Z_{SR}$. The motor drive circuit 38 includes a circuit, such as a bridge circuit comprised of field effect transistors, capable of rotating the drive motor 11 in forward and reverse directions. The motor drive circuit 38 may be arranged to rotate the drive motor 11 at the angle specified by the control signal $Z_{MR}$ and in the direction specified by the control signal $Z_{SR}$ with the use of a PWM control to control the current supplied to the drive motor 11.

Figure 3:
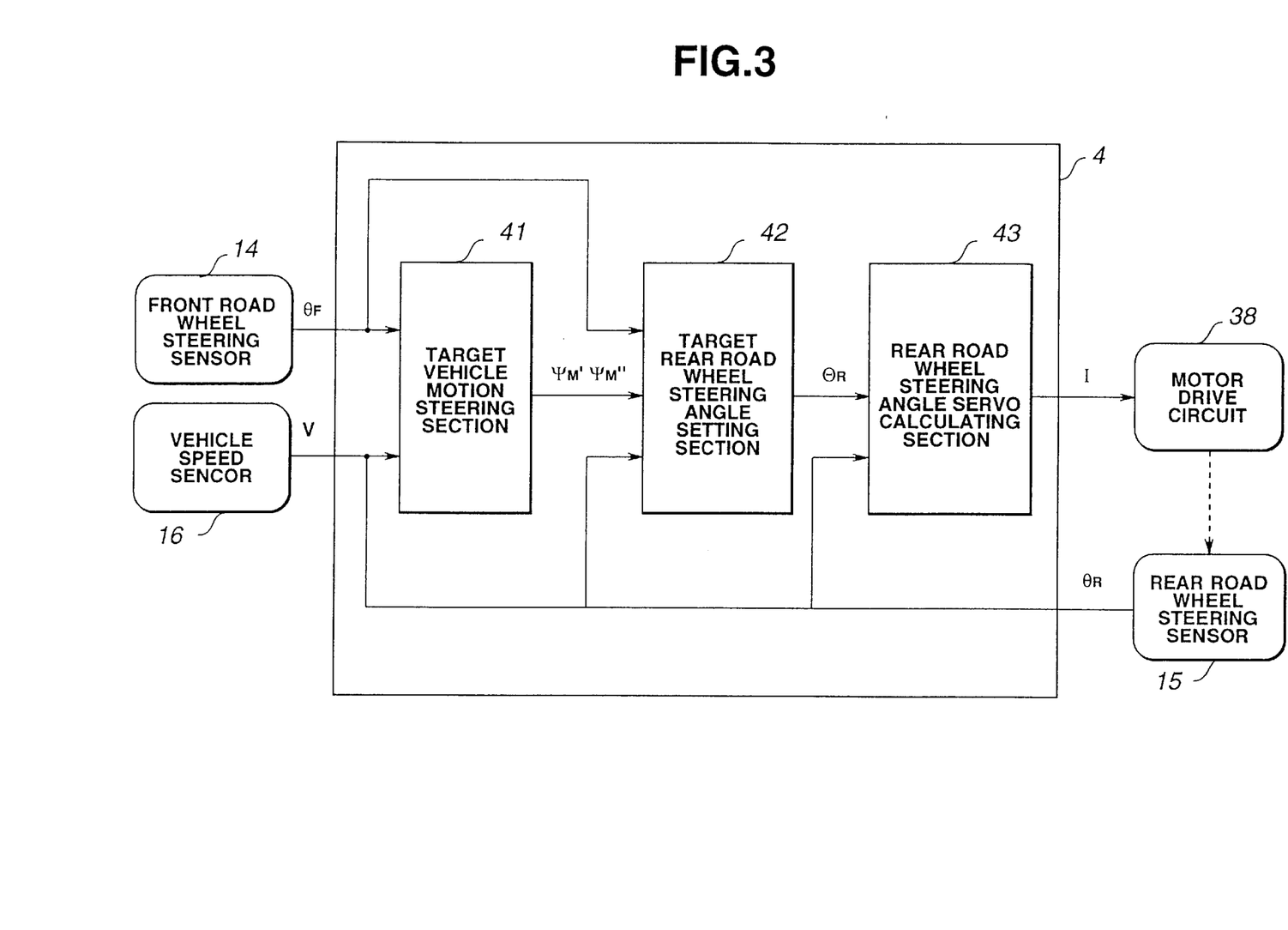
FIG. 3 is a block diagram used in explaining the operation of the control unit used in the vehicle motion control apparatus of FIG. 1.

Referring to FIG. 3, the operation of the control unit 4 will be described further. The control unit 4 includes a target vehicle motion setting section 41 which receives the front road wheel steering angle indicative signal from the front road wheel steering angle sensor 14 and the vehicle speed indicative signal from the vehicle speed sensor 16 and calculates a target yaw rate (target vehicle motion) $\Psi_M{}'$ and a target yaw angular velocity $\Psi_M{}''$ based on the sensed front road wheel steering angle and vehicle speed values $\theta_F$ and V. The calculated target yaw rate $\Psi_M{}'$ and target yaw angular velocity $\Psi_M{}''$ are transferred from the target vehicle motion setting section 41 to a target rear road wheel steering angle calculating section 42 which also receives the front road wheel steering angle indicative signal from the front road wheel steering angle sensor 14 and the vehicle speed indicative signal from the vehicle speed sensor 16. The target rear road wheel steering angle calculating section 42 calculates the target rear road wheel steering angle value $\Theta_R$ based on the calculated target yaw rate value $\Psi_M{}'$, the calculated target yaw angular velocity value $\Psi_M{}''$, the sensed front road wheel steering angle value $\theta_F$ and the sensed vehicle speed value V. The calculated target rear road wheel steering angle value $\Theta_R$ is transferred from the target rear road wheel steering angle calculating section 42 to a rear road wheel steering angle servo calculating section 43 which also receives the rear road wheel steering angle indicative signal from the rear road wheel steering angle sensor 15. The rear road wheel steering angle servo calculating section 43 calculates a target drive current value I to be supplied to operate the drive motor 11 based on the calculated target rear road wheel steering angle value $\Theta_R$ and the sensed rear road wheel steering angle value $\theta_R$. The rear road wheel steering angle servo calculating section 43 transfers the calculated target drive current value I to the motor drive circuit 11.

The target vehicle motion setting section 41 calculates the ratio of the target yaw rate $\Psi_M'$ with respect to the front road wheel steering angle $\theta_F$ is calculated from Equation (1).

$$\Psi_M'/\theta_F = G\Psi' \cdot \{\omega_n^2(n_1 s+1)\}/(s^2+2\zeta\omega_n s+\omega_n^2) \quad (1)$$

where $G\Psi'$, $\omega_n$, $n_1$ and $\zeta$ are parameters dependent on the vehicle speed, $G\Psi'$ is the yaw rate gain, $\omega_n$ is the natural angular frequency, $n_1$ is a value corresponding to the zero point, and $\zeta$ is the damping coefficient.

Figure 4A:
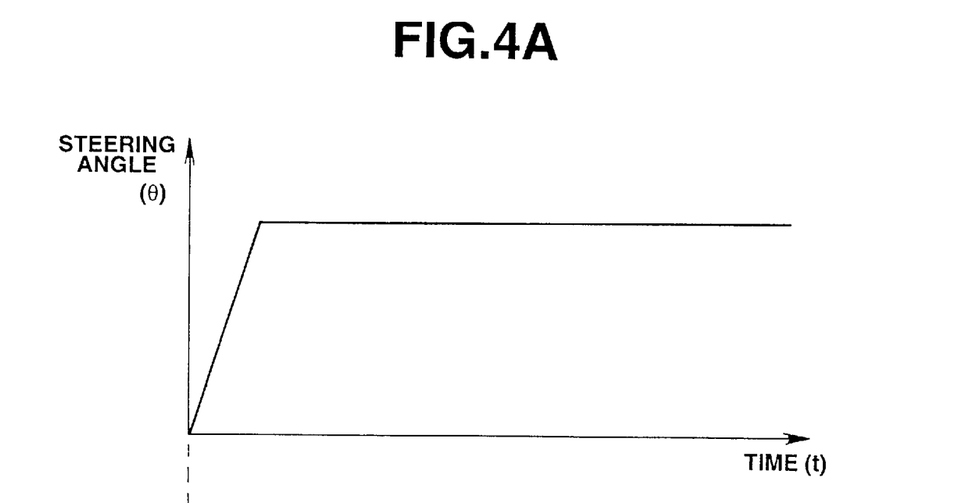
FIGS. 4A and 4B are graph used in explaining the parameters dependent on the vehicle speed.
Figure 4B:
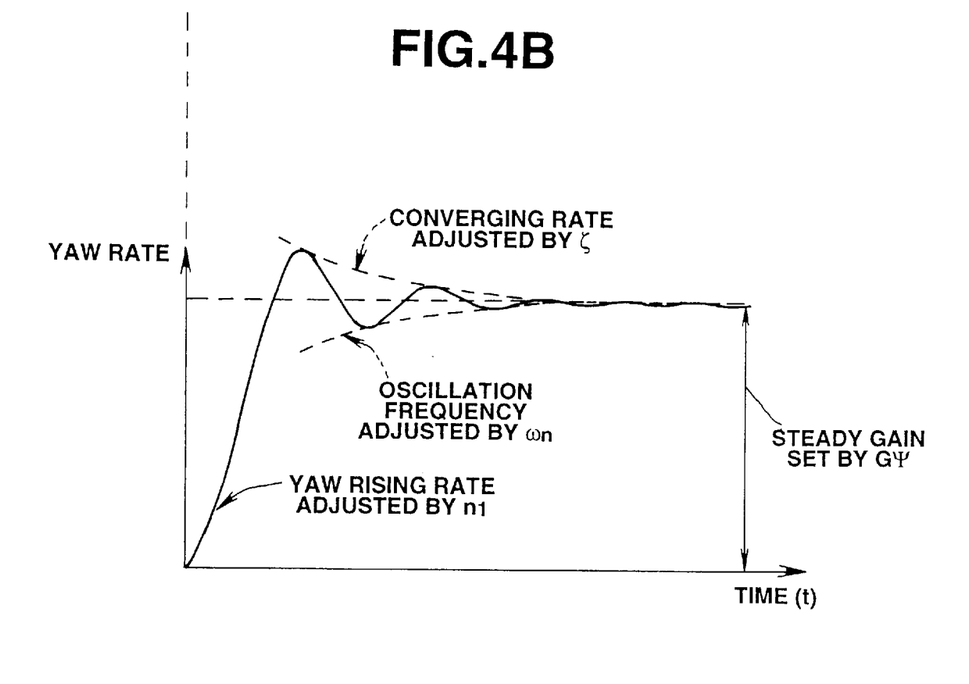

Referring to FIGS. 4A and 4B, the parameters dependent on the vehicle speed will be described further. FIG. 4A shows changes in steering angle $\theta$ with times and FIG. 4B shows the corresponding yaw rate changes with time. As shown in FIG. 4B, the yaw rate gain $G\Psi'$ specifies the steady gain, that is, the steady yaw rate with respect to the steering angle, the natural angular frequency $\omega_n$ specifies the oscillation frequency, the zero point corresponding value $n_1$ specifies the rate at which the yaw rate rises with respect to steering angle changes, that is, the yaw rate rising characteristic, and the damping coefficient $\zeta$ specifies the rate at which the yaw rate converges, that is, the yaw rate converging characteristic. Thus, the target yaw rate $\Psi_M'$, which is calculated from Equation (1) with the parameters set to provide a predetermined response characteristic, has a predetermined response characteristic. Since the parameters are set according to the vehicle speed, the response characteristic of the target yaw rate $\Psi_M'$ is different from one vehicle speed to another. It is also possible to provide response characteristics different only in the steady gain or the oscillation frequency by changing the yaw rate gain $G\Psi'$, the natural angular frequency $\omega_n$, the zero point corresponding value $n_1$ or the damping coefficient $\zeta$ separately.

Figure 5:
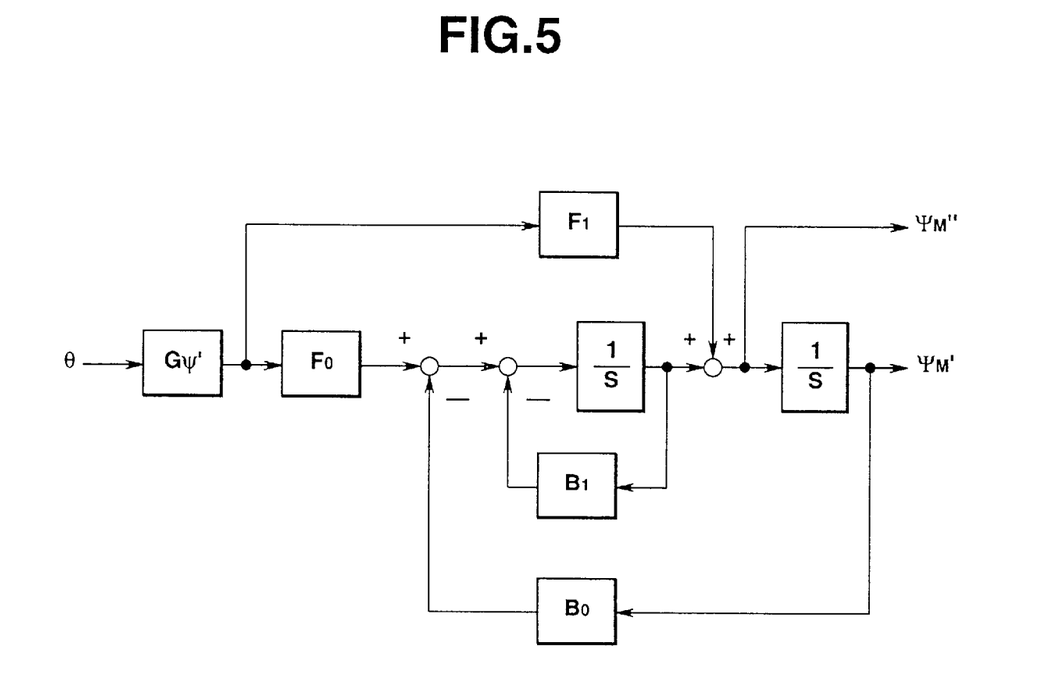
FIG. 5 is a block diagram used in explaining the arrangement for calculating the target vehicle motion value.

Referring to FIG. 5, the target vehicle motion setting section 41 will be described further. The target vehicle motion setting section 41 is arranged to provide a target yaw angular velocity $\Psi_M''$ for use in the target rear road wheel steering angle calculating section 42 and then integrate the target yaw angular velocity $\Psi_M''$ to provide a target yaw rate $\Psi_M'$. The characters $B_0$, $B_1$, $F_0$ and $F_1$ used in the blocks of FIG. 5 indicate as $$B_0 = \omega_n^2$$

$$B_1 = 2\zeta\omega_n$$

$$F_1 = n_1 \omega_n^2$$

$$F_0 = \omega_n^2 - B_1 \cdot F_1$$

The target rear road wheel steering angle calculating section 42 utilizes the reverse calculation from an equation of motions for an automotive vehicle having two degrees of freedom to calculate a target rear road wheel steering angle $\theta_R$ which can bring the actual yaw rate into coincidence with the target yaw rate $\Psi_M'$ from Equation (2) based on the target yaw rate value $\Psi_M'$, the target yaw angular velocity value $\Psi_M''$, the front road wheel steering angle value $\theta_F$ and the vehicle speed value V.

$$\Theta_R = \beta_R + (V_Y - L_R \cdot \Psi_M')/V \quad (2)$$

$$\beta_R = C_R/K_R$$

$$C_R = (L_F \cdot C_F - I_Z \cdot \Psi_M''/2)/L_R$$

$$C_F = eK_F \cdot \beta_F$$

$$\beta_F = \theta/N - (V_Y + L_F \cdot \Psi_M')/V$$

$$V_Y = \int V_Y' dt$$

$$V_Y' = (2C_F + 2C_R)/M - V \cdot \Psi_M'$$

where $V_Y$ is the vehicle lateral velocity, $\beta_F$ is the front road wheel lateral slip angle, $L_F$ is the distance between the front axle and the vehicle gravity center, $L_R$ is the distance between the rear axle and the vehicle gravity center, $C_F$ is the front road wheel cornering force, $C_R$ is the rear road wheel cornering force, $K_R$ is the rear road wheel cornering power, $eK_F$ is the equivalent front road wheel cornering power (front road wheel cornering power for which the cornering power decrease with respect to the steering angle because of the influence of the steering rigidity is taken into account), $I_z$ is the vehicle yaw inertia moment, M is the mass of the vehicle and N is the gear ratio.

The rear road wheel steering angle servo calculating section 43 converts the target rear road wheel steering angle value $\Theta_R$ into a target motor rotation angle $\delta'$ and calculates a target drive current value I to be supplied to operate the drive motor 11 based on the deviation of the calculated target motor rotation angle $\delta'$ from the sensed motor rotation angle $\delta$. The rear road wheel steering angle servo calculating section 43 determines the direction in which the drive motor 11 to rotate based on the last and new target motor rotation angles $\delta'_{t-1}$ and $\delta'_t$.

Figure 6:
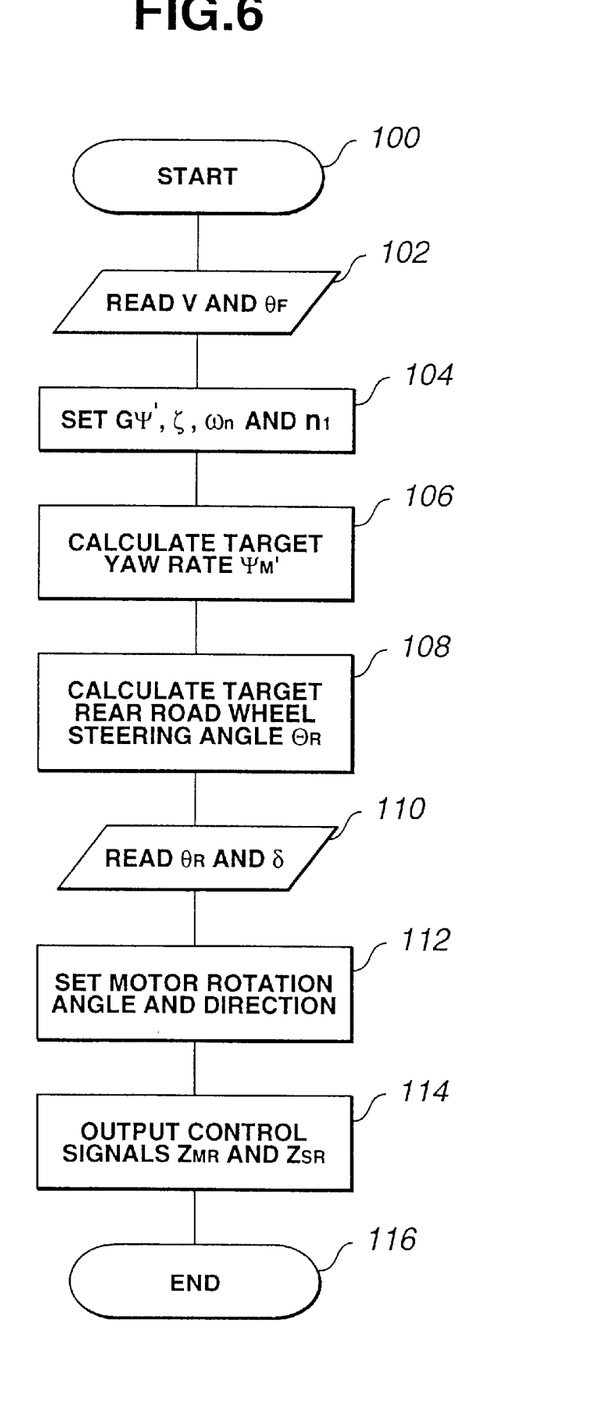
FIG. 6 is a flow diagram showing the programming of the digital computer as it is used to calculate the control signals.

FIG. 6 is a flow diagram illustrating the programming of the digital computer as it is used to produces the control signals $Z_{MR}$ and $Z_{SR}$. The computer program is entered at the point 100 at uniform intervals. At the point 102 in the program, the front road wheel steering angle $\theta_F$ sensed by the front road wheel steering angle sensor 14 and the vehicle speed V sensed by the vehicle speed sensor 16 are read into the computer program. At the point 104, the vehicle speed dependent parameters including the yaw rate gain $G\Psi'$, the natural angular frequency $\omega_n$, the zero point corresponding value $n_1$ and the damping coefficient $\zeta$ are calculated from look-up tables stored in the memory 35d. At the point 106, the target yaw rate $\Psi_M'$ is calculated from Equation (1) based on the calculated parameters and the sensed front road wheel steering angle $\theta_R$.

At the point 108 in the program, the target rear road wheel steering angle $\Theta_R$, which can bring the actual yaw rate into coincidence with the target yaw rate $\Psi_M'$, is calculated from Equation (2). At the point 110, the rear road wheel steering angle value $\theta_R$ sensed by the rear road wheel steering angle sensor 15 and the motor rotation angle $\delta$ measured by the circuit 34 are read into the computer memory. At the point 112, the calculated target rear road wheel steering angle $\Theta_R$ is converted into a corresponding target motor rotation angle $\delta'$. The target motor rotation angle $\delta'$ is stored in the computer memory. A target drive current value I to be supplied to operate the drive motor 11 is calculated through a PID control based on the deviation of the stored target motor rotation angle $\delta'$ from the sensed motor rotation angle $\delta$. The direction in which the drive motor 11 to rotate is determined based on the last and new target motor rotation angles $\delta'_{t-1}$ and $\delta'_t$. At the point 114, the calculated target drive current I is converted into a corresponding control signal $Z_{MR}$ and the determined direction is converted into a corresponding control signal $Z_{SR}$. These control signals $Z_{MR}$ and $Z_{SR}$ are outputted to the motor drive circuit 38. Following this, the program proceeds to the end point 116.

Figure 7:
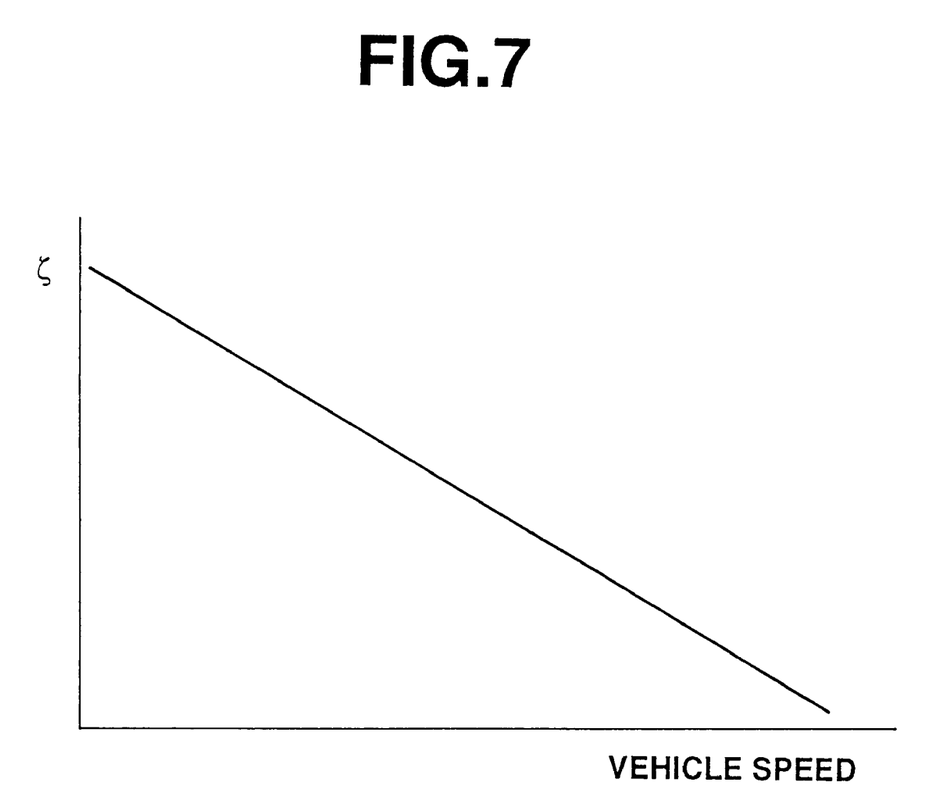
FIG. 7 is a graph of vehicle speed versus damping coefficient.

When the traffic lane is changed at a slow vehicle speed, the vehicle yaw motion is too small to provide a sense of incompatibility to the driver in spite of a rapid attenuation of the vehicle yaw motion. When the traffic lane is changed at a fast vehicle speed, however, a great vehicle yaw motion occurs to provide a sense of incompatibility with a rapid attenuation of the vehicle yaw motion. If the look-up table is set to decrease the damping coefficient $\zeta$ as the vehicle speed increases, as shown in FIG. 7, thus, the damping characteristic of the yaw rate will decrease as the vehicle speed increases since the response characteristic of the target yaw rate $\Psi_M'$ is set based on the damping coefficient $\zeta$.

Figure 8A:
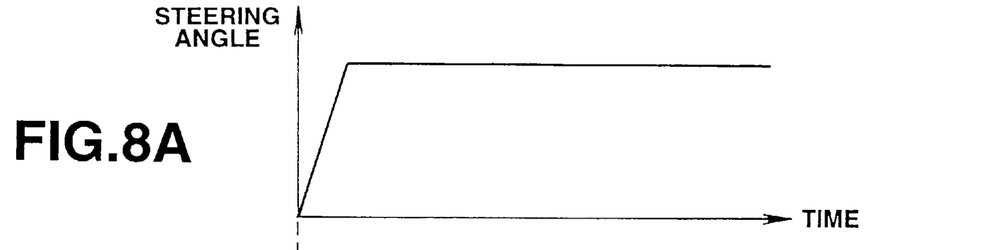
FIGS. 8A and 8B are graphs used in explaining the response characteristic obtained by the vehicle motion control apparatus of the invention.
Figure 8B:
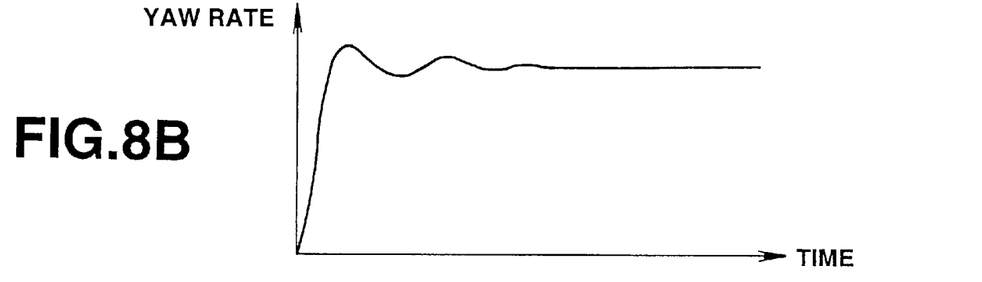

Since the rear road wheel steering angle is controlled to bring the vehicle yaw rate into coincidence with the target yaw rate $\Psi_M'$ set in such a manner, the damping coefficient $\zeta$ is set at a smaller value to decrease the damping characteristic of the target yaw rate $\Psi_M'$ as the vehicle speed increases when the driver makes a rapid traffic lane change at a fast vehicle speed, as shown in FIGS. 8A and 8B. Thus, the vibration of the vehicle will converge in such a natural manner as to provide no sense of incompatibility to the driver after the traffic lane change. The damping coefficient $\zeta$ is set at a greater value to increase the damping characteristic of the target yaw rate $\Psi_M'$ as the vehicle speed decreases when the vehicle speed is slow. Although the vibration of the vehicle converges at a fast rate, the vehicle yaw motion is too small to provide a sense of incompatibility to the driver. It is, therefore, possible to ensure good steering response at low vehicle speeds and good stability without providing a sense of incompatibility to the driver at high vehicle speeds.

The vehicle speed dependent parameters used in setting the yaw rate response characteristic can be set at desired values. It is, therefore, possible to provide desired vehicle behaviors having a converging characteristic according to the driver's demand. For example, it is possible to realize a quick motion for a rapid traffic lane change by setting the damping coefficient $\zeta$ at a great value even at a fast vehicle speed. Furthermore, the yaw rate gain $G\Psi'$, the natural angular frequency $\omega_n$, and the zero point corresponding value $n_1$ can be set at desired values. It is, therefore, possible to provide a desired yaw rate response characteristic according to the driver's demand.

Since the target vehicle motion is represented by the vehicle yaw rate and the transfer function is set in the form of (an equation of the first degree)/(an equation of the second degree), it is possible to provide good vehicle yaw rate and lateral acceleration frequency response characteristics so as to provide vehicle behaviors.

While the invention has been described in connection with a control unit 30 taken in the form of a digital computer, it is to be understood that the control unit may be taken in the form of a combination of electric circuits such as adders, integrators and the like. While the vehicle speed dependent parameters are set as a function of vehicle speed V, it is to be understood that they may be set as a function of gear ratio from which the vehicle speed is derived. While the invention has been described in connection with the auxiliary steering control for the rear road wheels, it is to be understood that the invention is applicable to the auxiliary steering control for the front road wheels. While the invention has been described in connection with a rear road wheel steering angle control made based on the steering wheel steering angle sensed by the front road wheel steering angle sensor, it is to be understood that the actual front road wheel steering angle sensed by a potentiometer associated with the front road wheel tie rod may be used to control the rear road wheel steering angle. In this case, the front road wheel cornering force $C_F$ (see Equation (2)) is calculated from Equation (3).

$$C_F = K_F \cdot \beta_F \quad (3)$$

where $K_F$ is the front road wheel cornering power. While the invention has been described in connection with the vehicle motion taken in the form of vehicle yaw rate, it is to be understood that the vehicle motion may be vehicle lateral acceleration, vehicle lateral slip angle or the like.

What is claimed is:

1. An apparatus for controlling a motion of a vehicle supported on steered and non-steered road wheels, comprising:

means for sensing vehicle operating conditions including steering angle and vehicle speed;

means for calculating a target vehicle motion value based on the sensed steering angle and vehicle speed to provide a predetermined response characteristic related to a vehicle plane behavior, the response characteristic having a damping characteristic;

means for calculating a target steering angle value for the non-steered road wheel to realize the vehicle plane behavior according to the target vehicle motion value;

means for steering the non-steered road wheels according to the calculated target steering angle value; and means for decreasing the damping characteristic as the sensed vehicle speed increases.

2. The vehicle motion control apparatus as claimed in claim 1, wherein yaw rate is applied to the target vehicle motion value.

3. An apparatus for controlling a motion of a vehicle supported on steered and non-steered road wheels, comprising:

means for sensing steering angle;

means for sensing vehicle speed;

means for calculating a target vehicle motion value based on the sensed steering angle and vehicle speed to provide a predetermined vehicle plane behavior related response characteristic realized by a transfer function between the sensed steering angle and the target vehicle motion value, the transfer function having a damping coefficient;

means for calculating a target steering angle value for the non-steered road wheel to realize the vehicle plane behavior according to the target vehicle motion value;

means for steering the non-steered road wheels according to the calculated target steering angle value; and means for decreasing the damping coefficient as the sensed vehicle speed increases.

4. The vehicle motion control apparatus as claimed in claim 3, wherein yaw rate is applied to the target vehicle motion value.

5. The vehicle motion control apparatus as claimed in claim 3, wherein the transfer function is defined as (an equation of the first degree)/(an equation of the second degree).

6. The vehicle motion control apparatus as claimed in claim 5, wherein yaw rate is applied to the target vehicle motion value.

7. An apparatus for controlling a motion of a vehicle supported on steered and non-steered road wheels, comprising:

detectors for sensing vehicle operating conditions including steering angle and vehicle speed;

means for calculating a target vehicle motion value based on the sensed steering angle and vehicle speed to provide a predetermined response characteristic related to a vehicle plane behavior, the response characteristic having a damping characteristic;

means for calculating a target steering angle value for the non-steered road wheel to realize the vehicle plane behavior according to the target vehicle motion value;

means for steering the non-steered road wheels according to the calculated target steering angle value; and means for decreasing the damping characteristic as the sensed vehicle speed increases.

8. An apparatus for controlling a motion of a vehicle supported on steered and non-steered road wheels, comprising:

a first detector for sensing steering angle;

a second detector for sensing vehicle speed;

means for calculating a target vehicle motion value based on the sensed steering angle and vehicle speed to provide a predetermined vehicle plane behavior related response characteristic realized by a transfer function between the sensed steering angle and the target vehicle motion value, the transfer function having a damping coefficient;

means for calculating a target steering angle value for the non-steered road wheel to realize the vehicle plane behavior according to the target vehicle motion value;

means for steering the non-steered road wheels according to the calculated target steering angle value; and means for decreasing the damping coefficient as the sensed vehicle speed increases.

* * * * *